United States Patent
Gehring et al.

(10) Patent No.: US 6,974,377 B2
(45) Date of Patent: Dec. 13, 2005

(54) AIR DUCT OUTLETS FOR INCLINED SURFACES

(75) Inventors: Thomas F.J. Gehring, Scarborough (CA); Ireneusz Jankowski, Richmond Hill (CA); Dejan Havidic, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/939,202

(22) Filed: Sep. 10, 2004

(65) Prior Publication Data

US 2005/0176364 A1 Aug. 11, 2005

Related U.S. Application Data

(60) Provisional application No. 60/542,132, filed on Feb. 5, 2004.

(51) Int. Cl.[7] ................................................. B60H 1/34
(52) U.S. Cl. ..................................... 454/152; 454/154
(58) Field of Search ............................... 454/155, 154, 454/152

(56) References Cited

U.S. PATENT DOCUMENTS

| | | | | |
|---|---|---|---|---|
| 2,987,981 A | * | 6/1961 | Boylan ........................ | 454/154 |
| 3,648,592 A | * | 3/1972 | Nieboer ...................... | 454/154 |
| 3,824,910 A | * | 7/1974 | Temming .................... | 454/154 |
| 3,921,507 A | * | 11/1975 | Condet et al. .............. | 454/155 |
| 4,633,770 A | * | 1/1987 | Taylor et al. ............... | 454/202 |
| 4,970,947 A | * | 11/1990 | Soethout ..................... | 454/155 |
| 5,120,272 A | * | 6/1992 | Soethout et al. ............ | 454/155 |
| 5,569,076 A | * | 10/1996 | Sudak et al. ................ | 454/155 |
| 5,588,910 A | * | 12/1996 | Hutter et al. ............... | 454/154 |
| 5,722,883 A | * | 3/1998 | Schwarz ..................... | 454/155 |
| 5,733,191 A | * | 3/1998 | Lam et al. .................. | 454/290 |
| 5,752,877 A | * | 5/1998 | Sun ............................. | 454/155 |
| 5,947,813 A | * | 9/1999 | Chow et al. ................ | 454/155 |
| 6,059,652 A | * | 5/2000 | Terry et al. ................. | 454/155 |
| 6,131,336 A | * | 10/2000 | Krause et al. .............. | 49/74.1 |
| 6,146,265 A | * | 11/2000 | Greenwald .................. | 454/155 |
| 6,394,891 B1 | * | 5/2002 | Arold .......................... | 454/155 |
| 6,554,696 B2 | * | 4/2003 | Kowalski et al. ........... | 454/155 |
| 6,582,293 B1 | * | 6/2003 | Siniarski et al. ............ | 454/155 |
| 6,652,371 B2 | * | 11/2003 | Kamio ........................ | 454/155 |

* cited by examiner

*Primary Examiner*—Derek S. Boles
(74) *Attorney, Agent, or Firm*—Myers Bigel Sibley & Sajovec

(57) ABSTRACT

Air duct outlets for use on inclined surfaces within vehicles are provided. An air duct outlet includes a body having a fascia with an opening formed therein. A louver assembly is disposed within the fascia opening and is movable between a first position substantially flush with the fascia and a second position substantially nonflush with the fascia. The louver assembly includes a housing having an inlet and an outlet. A set of louvers are secured within the housing in spaced-apart adjacent relationship and are configured to adjust the direction of air flowing through the housing. An actuator extends from the fascia adjacent the opening and is operably connected with the louver assembly. Movement of the actuator within a first range causes pivotal movement of the louvers, and movement of the actuator within a second range causes pivotal movement of the louver assembly between the first and second positions.

31 Claims, 11 Drawing Sheets

AIR DUCT OUTLETS FOR INCLINED SURFACES

RELATED APPLICATION

This application claims the benefit of U.S. Provisional Application No. 60/542,132 filed Feb. 5, 2004, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a cooling and/or heating system that provides cooled and/or heated air. Because it is generally desirable for vehicle occupants to be able to adjust the direction of air flow within a vehicle interior, air duct outlets are typically provided with adjustable louvers. In addition, air duct outlets may be provided with dampers for allowing vehicle occupants to control the amount of air flowing therethrough.

Various types of air duct outlets can be provided depending upon special functions, air directability and design constraints within the vehicle. See, for example, U.S. Pat. Nos. 4,345,510; 4,702,156; and 4,006,673. Vehicle manufacturers are continuously seeking components, such as air duct outlets, that have enhanced functionality and durability, yet are cost effective to manufacture. Vehicle manufacturers are also continuously seeking components, such as air duct outlets, that can enhance styling within a vehicle, yet remain functional and economical.

SUMMARY OF THE INVENTION

In view of the above discussion, air duct outlets for use on inclined surfaces within vehicles are provided. According to an embodiment of the present invention, an air duct outlet, includes a body having a fascia with an opening formed therein. A louver assembly is disposed within the fascia opening and is movable between a first position substantially flush with the fascia and a second position substantially nonflush with the fascia. The louver assembly includes a housing having an inlet and an outlet. A set of louvers are secured within the housing in spaced-apart adjacent relationship and are configured to adjust the direction of air flowing through the housing. An actuator extends from the fascia adjacent the opening and is operably connected with the louver assembly. Movement of the actuator within a first range causes pivotal movement of the louvers, and movement of the actuator within a second range causes pivotal movement of the louver assembly between the first and second positions.

According to another embodiment of the present invention, an air duct outlet includes a housing having a planar first wall and a convexly-curved second wall that are in adjacent, spaced-apart relationship and that define an air passageway having an inlet and a flared outlet. An air stream flowing through the air passageway adheres to the second wall and exits from the outlet in a direction that is substantially transverse to a direction normal to the outlet. A set of louvers may be pivotally secured within the housing in spaced-apart adjacent relationship and that are configured to adjust the direction of air flowing through the housing.

According to embodiments of the present invention, actuators for movement of louvers and louver assemblies may incorporate ratcheting mechanisms that are configured to cause selective, incremental movement thereof.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
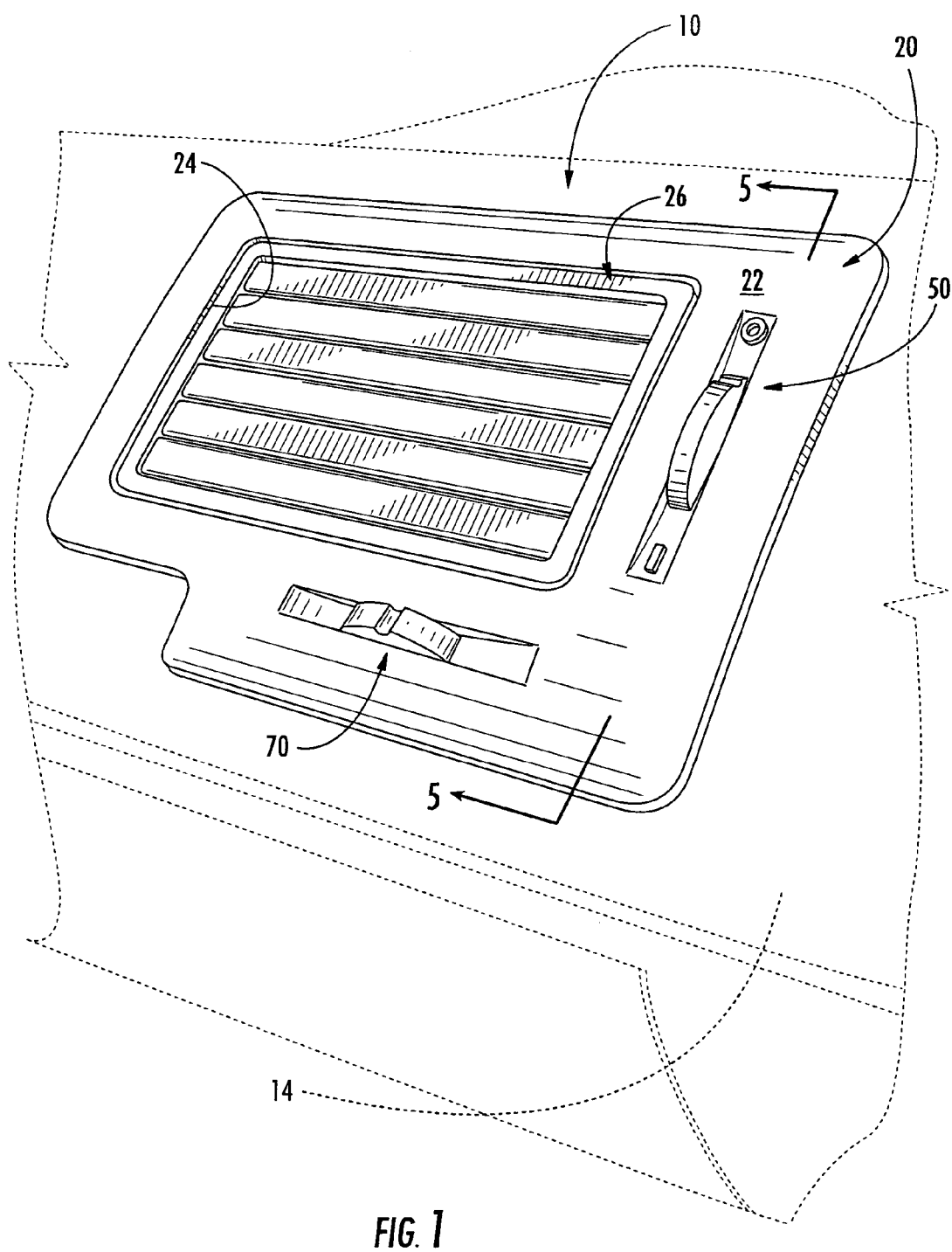
FIG. 1 is a front, perspective view of an air duct outlet, according to embodiments of the present invention, that illustrates the air duct outlet in a flush-mounted position relative to an inclined portion of an instrument panel and with the horizontal louvers fully closed.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

As used herein, phrases such as "between X and Y" and "between about X and Y" should be interpreted to include X and Y.

As used herein, phrases such as "between about X and Y" mean "between about X and about Y."

As used herein, phrases such as "from about X to Y" mean "from about X to about Y."

As used herein, the term "and/or" includes any and all combinations of one or more of the associated listed items.

Referring to FIGS. 1–9, an air duct outlet 10, according to embodiments of the present invention, is illustrated. The illustrated air duct outlet 10 is designed for use within the interior compartments of vehicles, such as automobiles, trucks, trains, boats, aircraft, and the like. However, it is understood that air duct outlets according to embodiments of the present invention may be utilized in various environments (e.g., residential and commercial buildings) and are not limited only to use in vehicles.

Figure 2:
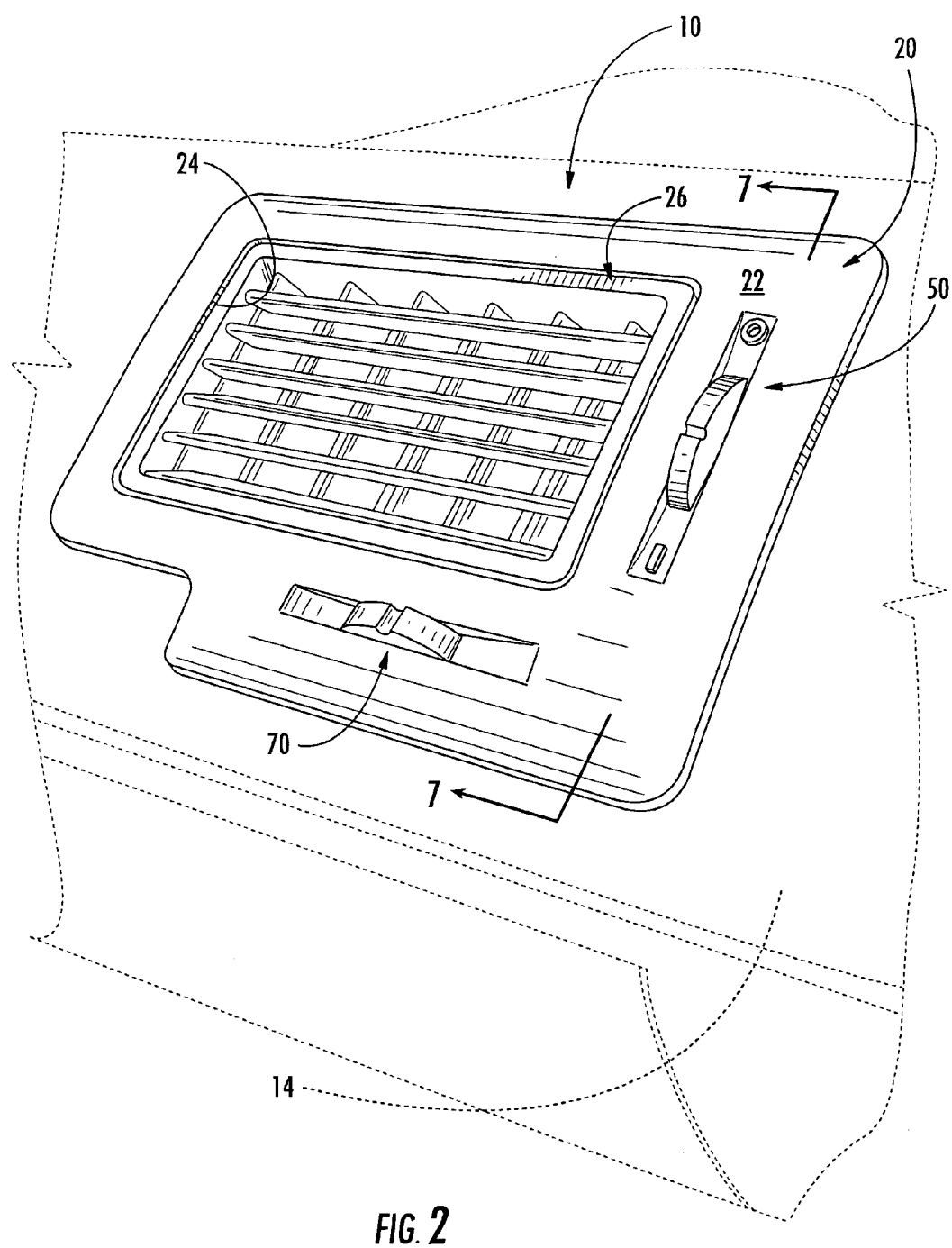
FIG. 2 is a front, perspective view of the air duct outlet of FIG. 1 that illustrates the horizontal louvers partially open.
Figure 3:
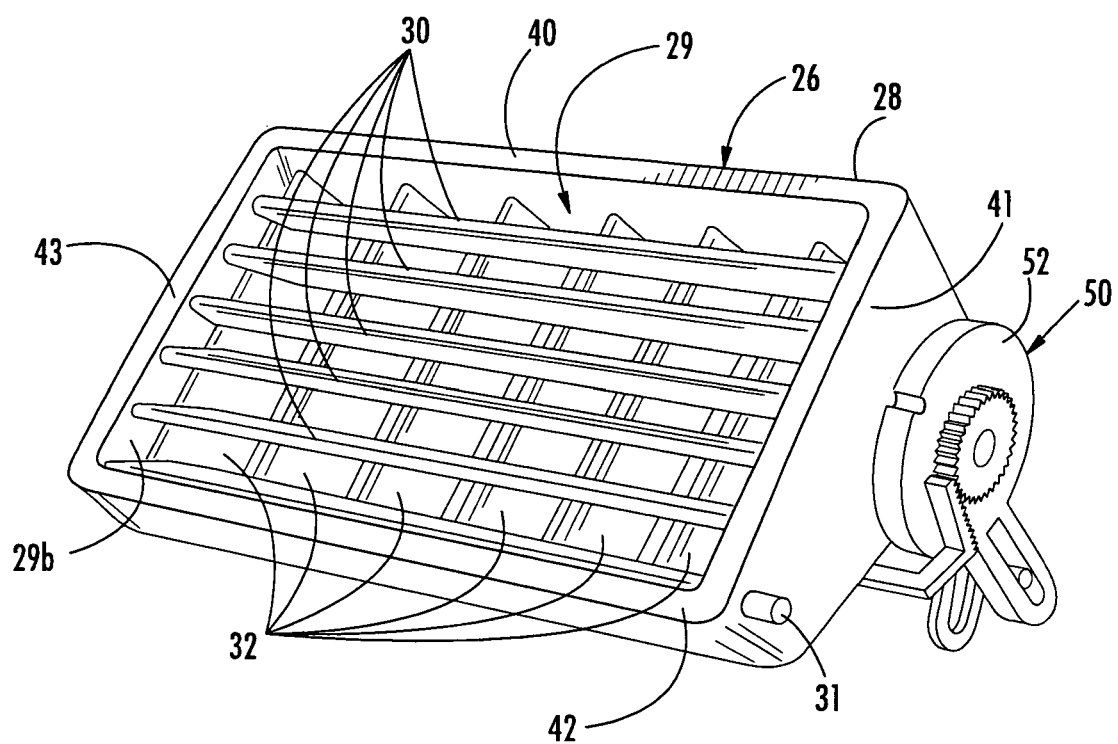
FIG. 3 is a perspective view of the louver assembly utilized in the air duct outlet of FIG. 1.

Referring initially to FIGS. 1–3, the illustrated air duct outlet 10 is disposed within an opening in the instrument panel 14 of a vehicle and includes a body 20 having a fascia 22 with an opening 24 formed therein. The portion of the instrument panel 14 in which the air duct outlet 10 is disposed has a slanted configuration, as illustrated.

Figure 4:
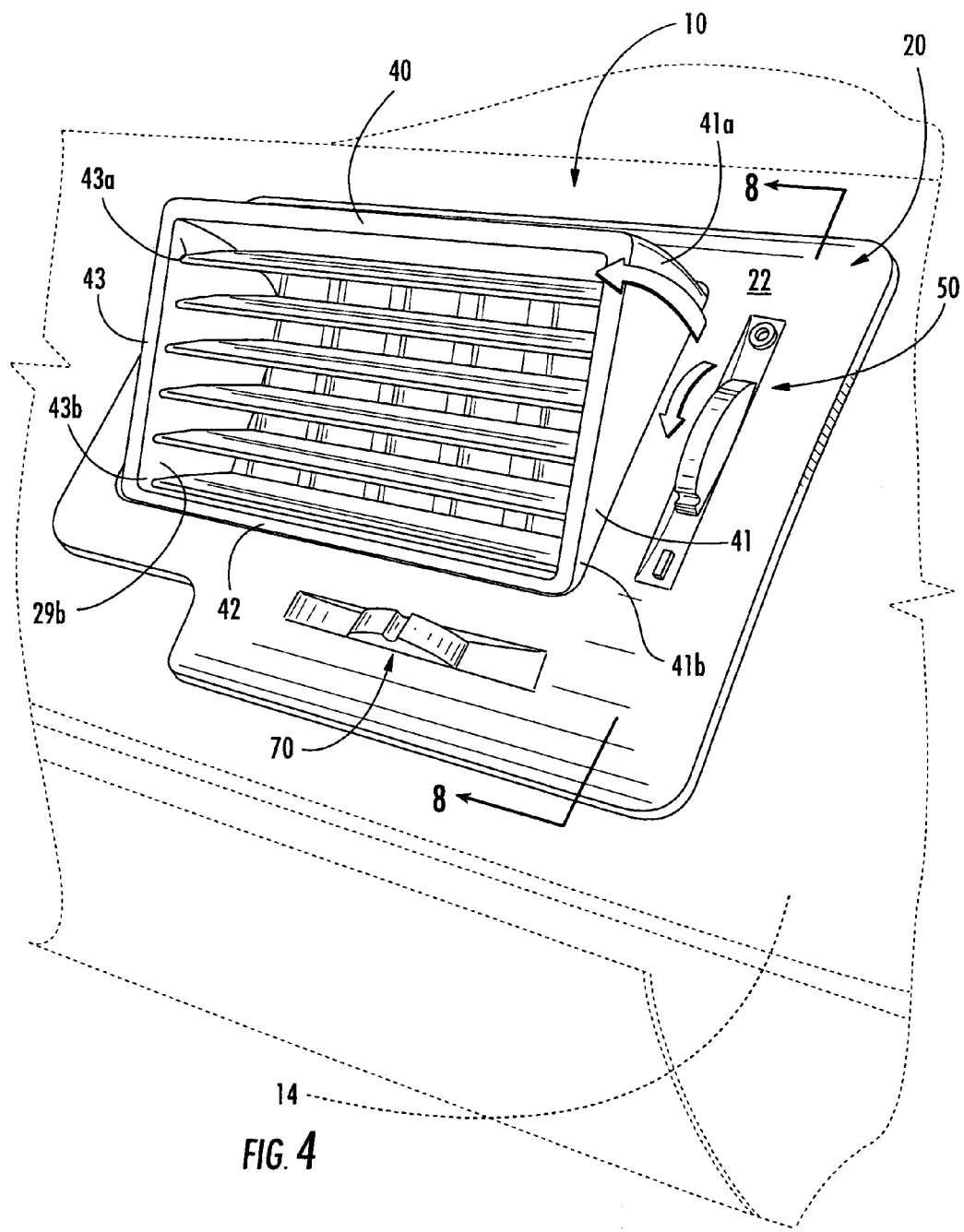
FIG. 4 is a front, perspective view of the air duct outlet of FIG. 1 that illustrates the air duct outlet in a position extending outwardly from the instrument panel.

A louver assembly 26 (FIG. 3) is operably mounted within the fascia opening 24 and is configured to adjust the direction of air flowing through the air duct outlet 10. The louver assembly 26 is movable between first (FIG. 1) and second positions (FIG. 4). In the first position, the louver assembly 26 is substantially flush with the fascia 22. In the second position, the louver assembly 26 is pivoted outwardly from the body 20 so as to be substantially nonflush with the fascia 22. Movement of the louver assembly 26 from the first position (FIG. 1) allows a user to position the louver assembly 26 such that air can be adequately directed even though the instrument panel 14 has a sharply sloping angle. This allows air duct outlets according to embodiments of the present invention to be positioned on horizontal and other non-vertical portions of instrument panels and other surfaces yet still be able to direct air to passengers effectively.

The illustrated louver assembly 26 includes a housing 28 and first and second sets of louvers 30, 32. The louvers 30, 32 are configured to adjust the direction of air flowing through the housing 28. The illustrated housing 28 includes walls 40, 41, 42, 43 that collectively define an air passageway 29 that terminates at an air inlet 29a (FIG. 5) and an air outlet 29b in the housing 28. Wall 40 has an arcuate configuration, as illustrated in FIGS. 4–8. Side walls 41, 43 have planar configurations with respective arcuate first end portions 41a, 43a and respective generally linear second end portions 41b, 43b, as illustrated in FIGS. 4–8. Bottom wall 42 has a generally rectangular configuration, as illustrated in FIGS. 4–8. As would be understood by those skilled in the art, the housing 28 is configured to be connected to a source of air flow, such as a fan, that supplies heated and/or cooled air (as well as ambient outside air). Other embodiments of the present invention may include housings with different shapes and configurations (e.g., arcuate, round, elongated, etc.). Embodiments of the present invention are not limited to the illustrated configuration of the housing 28. According to embodiments of the present invention, one or more of the housing walls 40–43 can be convexly-curved so as to serve the function of a coanda surface.

Housing 28 is pivotally attached to the body 20 via pins 31 and pivots about axis $A_1$ between the first and second positions. However, embodiments of the present invention are not limited to the illustrated configuration. Embodiments of the present invention may include movably attaching the housing 28 within the body 20 in other ways so that the louver assembly 26 can move from a substantially flush position-relative to the fascia 22 to a position substantially nonflush with the fascia 22.

In the illustrated embodiment, the first set of louvers 30 are pivotally secured within the housing 28 adjacent the housing outlet 29b, and the second set of louvers 32 are pivotally secured within the housing 28 upstream from the first set of louvers 30, as illustrated. The louvers 30 in the first set are in spaced-apart adjacent relationship, and each louver 30 is pivotally secured about one of a plurality of substantially parallel axes $A_2$ (FIGS. 5–8). The first set of louvers 30 are operably connected together such that pivotal movement of any one of the louvers 30 causes pivotal movement of the remaining louvers 30 in the first set.

In the illustrated embodiment, the first and second sets of louvers 30, 32 do not overlap or engage with each other. The second set of louvers 32 are pivotally secured within the housing 28 in spaced-apart adjacent relationship. Each louver 32 in the second set is pivotally secured about one of a second plurality of substantially parallel axes (not shown for clarity reasons) that are transverse to axes $A_2$. The second set of louvers 32 are also operably connected together such that pivotal movement of any one of the louvers 32 causes pivotal movement of the remaining louvers 32 in the second set. In the illustrated embodiment, the first and second set of louvers 30, 32 are, but need not be, substantially orthogonal relative to each other. The pivot axes for the first and second sets of louvers 30, 32 may, but need not, lie in the same plane (i.e., coplanar).

Figure 9:
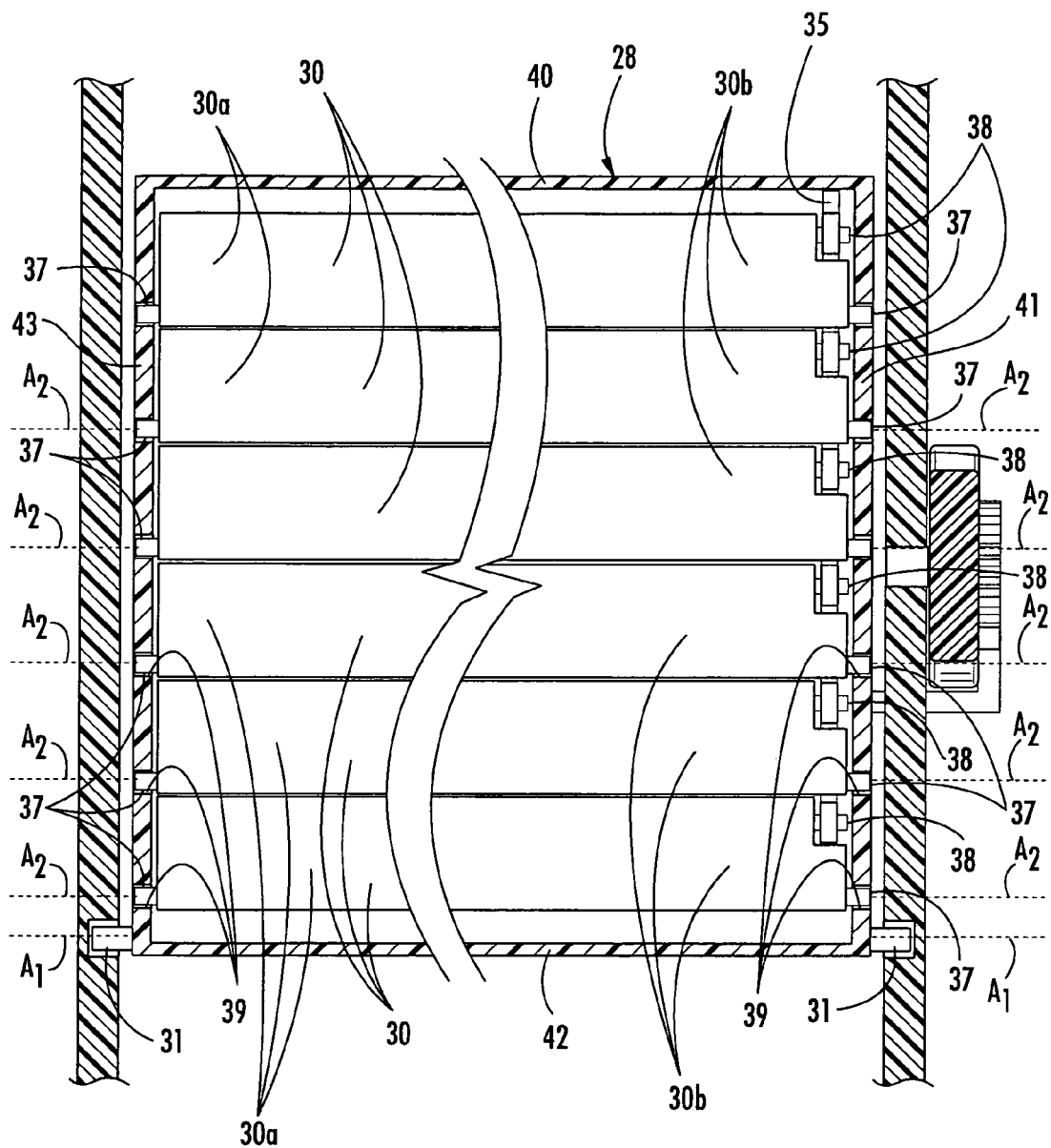
FIG. 9 is a section view of the air duct outlet louver assembly housing of the present invention taken along lines 9—9 in FIG. 5 that illustrates how the louver assembly housing pivots and how the first set of louvers within the louver assembly housing pivot.

Referring to FIG. 9, the first set of louvers 30 are pivotally secured to the housing 28 via respective pins 37 that extend from each end portion 30a, 30b of each louver 30, as illustrated. Each pin 37 engages a respective aperture 39 formed in walls 41, 43 of housing 28 and defines an axis $A_2$ about which each louver 30 pivots. Apertures 39 are in spaced-apart, adjacent relationship to maintain the desired spacing of the louvers 30.

Figure 5:
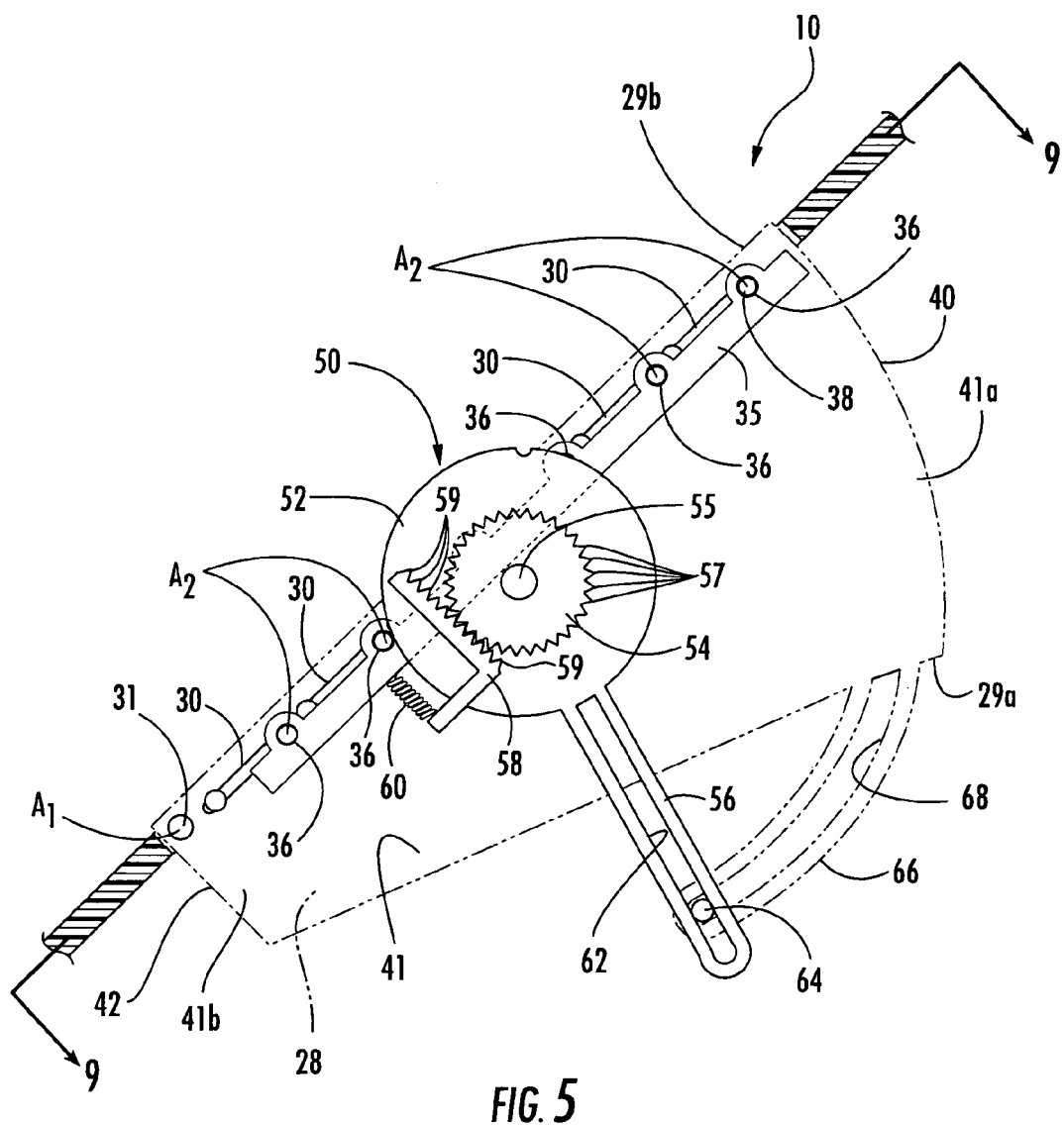
FIG. 5 is a section view of the air duct outlet of FIG. 1 taken along lines 5—5 and that illustrates the horizontal louver actuator that is also configured to pivot the air duct outlet between flush and non-flush positions.

Referring to FIG. 9 and FIG. 5, the first set of louvers 30 are movably connected together along end portion 30b thereof via a connecting member 35. Pivotal movement of a single one of the louvers 30 causes pivotal movement of the remaining louvers 30 via connecting member 35. The connecting member 35 has a slender, elongated configuration with a plurality of spaced-apart apertures 36 formed therein, as illustrated in FIG. 5. Each aperture 36 is configured to operably engage a respective pin 38 extending from louver end portion 30b.

The second set of louvers 32, as illustrated in FIG. 3, are pivotally secured to the housing 28 and are movable in a manner similar to the first set of louvers 30, and accordingly, need not be described further herein.

In the illustrated embodiment, a thumbwheel 52 of actuator 50 extends from the fascia 22 adjacent the opening 24.

The actuator 50 is operably connected with the first set of louvers 30 and with the louver assembly 26 and is configured to move the louver assembly 26 between the first and second positions and to cause pivotal movement of the louvers 30. Accordingly, user movement of the actuator 50 causes movement of the louvers 32 and movement of the louver assembly housing 28.

Referring to FIGS. 5–8, the illustrated actuator thumb wheel 52 is axially coupled to a pinion gear 54 via a shaft 55. A first slider arm 56 also extends from the thumb wheel 52, as illustrated. A rack 58, having a plurality of spaced-apart teeth 59, is connected to louver connecting member 35 via a biasing member (e.g., a spring) 60. The teeth 57 of pinion gear 54 matingly engages the teeth 59 of rack 58. Accordingly, user rotation of the thumb wheel 52, causes rotation of the pinion gear 54, which causes the rack 58 to move, which causes pivotal movement of the louver connecting member 35, which, in turn, causes pivotal movement of the louvers 30.

Embodiments of the present invention are not limited to the illustrated rack and pinion gear mechanism. Various other mechanisms may be utilized for operably coupling the actuator 50 and the louvers 30, such as, for example, a ratcheting mechanism. A ratcheting mechanism can allow for selective, incremental movement. Each user actuation of a ratcheting mechanism will cause movement of something by a predetermined amount. For example, if a ratcheting mechanism were used in the illustrated embodiment of FIGS. 1–9, user movement of the actuator 50 would cause selective, incremental movement of the louvers 30 and of the louver assembly housing 28.

Ratcheting mechanisms are well known in the art and need not be described further herein. An exemplary ratcheting mechanism is described in U.S. Pat. No. 5,752,877, and is incorporated herein by reference in its entirety. A ratcheting mechanism, according to embodiments of the present invention, may utilize push button actuators wherein each press of a button by a user causes incremental movement of louvers and/or movement of a louver assembly.

Figure 7:
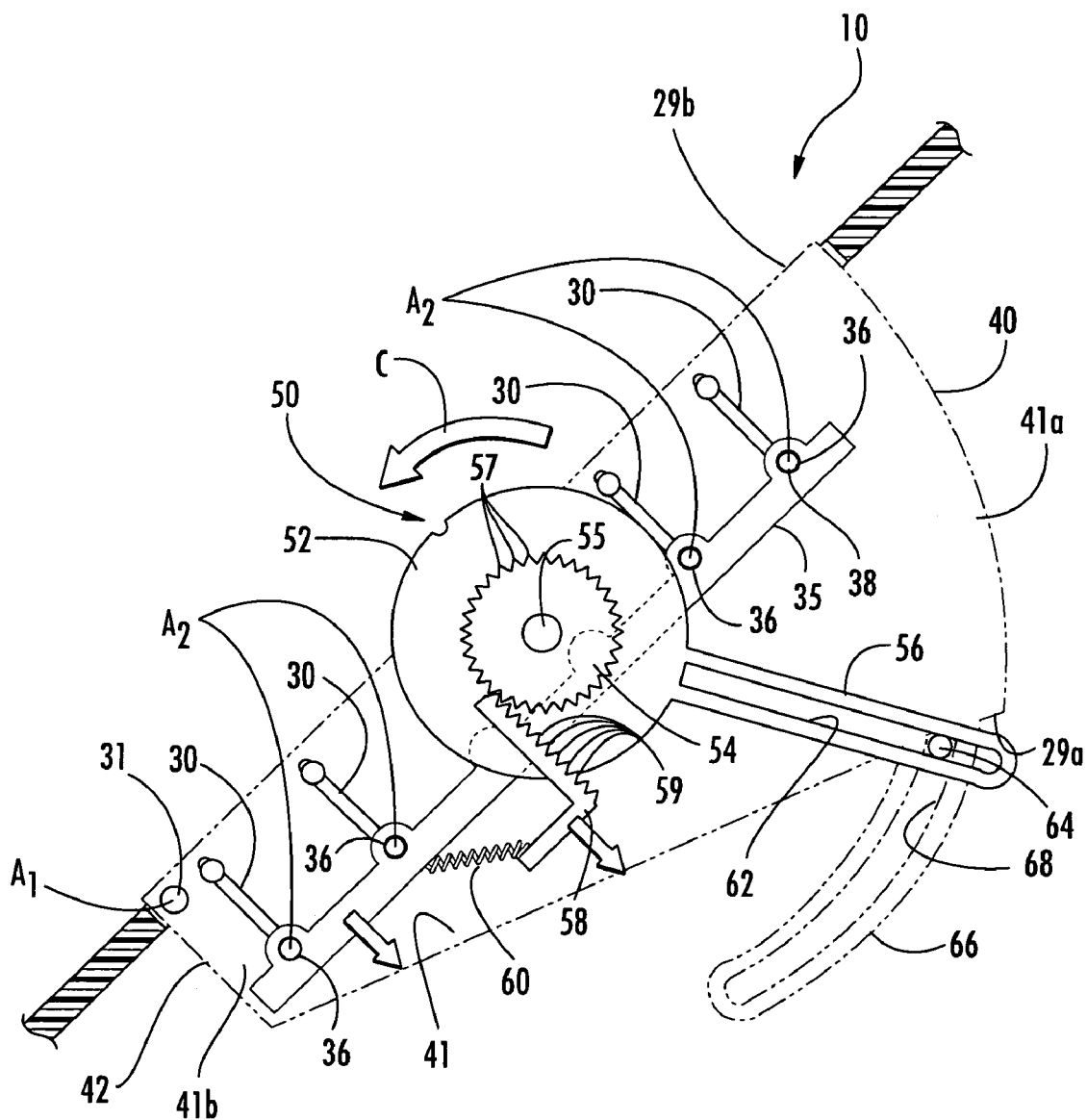
FIG. 7 is a section view of the air duct outlet of FIG. 2 taken along lines 7—7 and that illustrates further rotation of the actuator such that the horizontal louvers are fully open.
Figure 8:
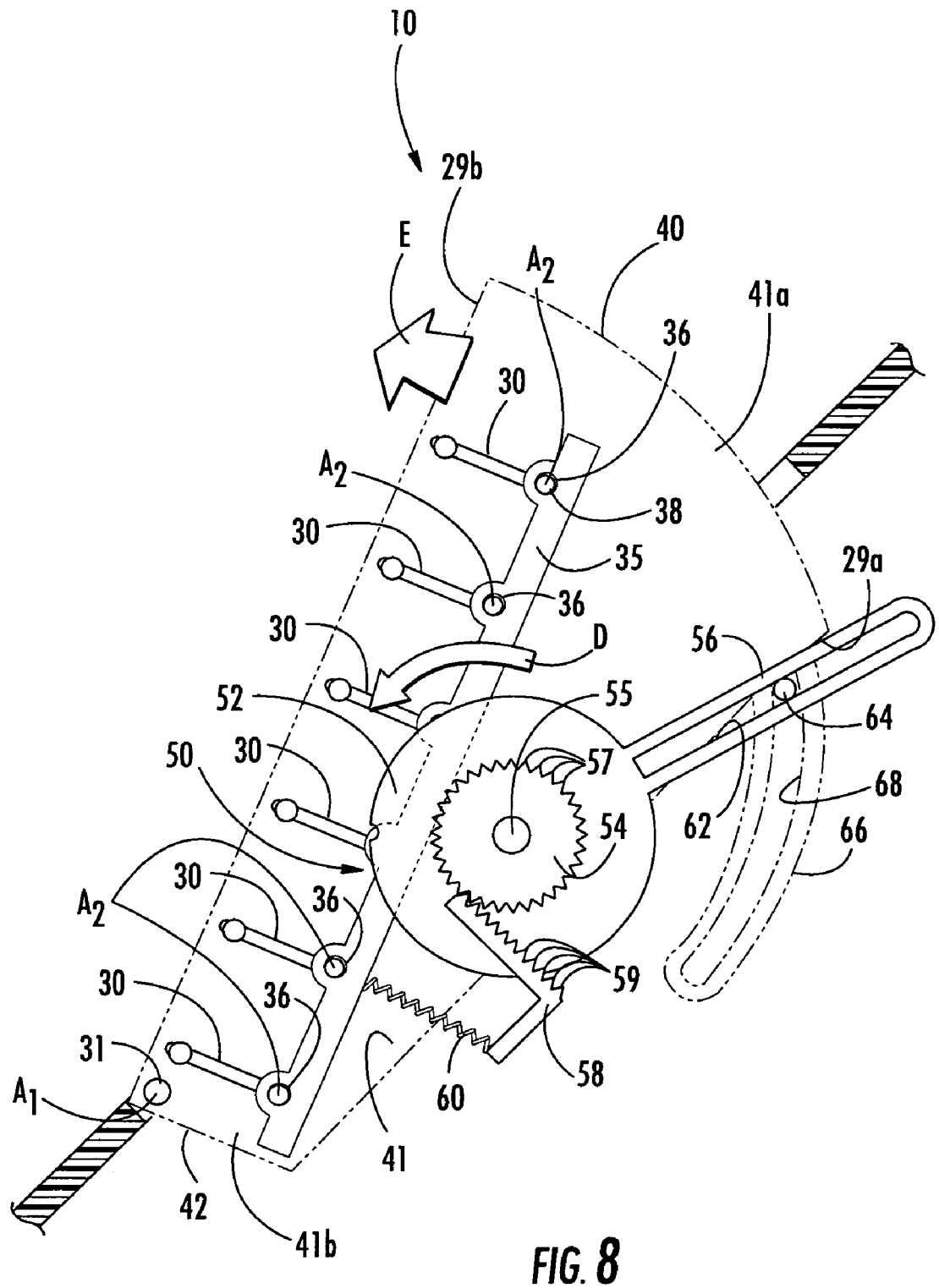
FIG. 8 is a section view of the air duct outlet of FIG. 4 taken along lines 8—8 and that illustrates full rotation of the actuator such that the air duct outlet fully extends outwardly from the instrument panel.

The first slider arm 56 has an elongated slot 62 with a pin 64 slidably engaged therein. A second slider arm 66 has an arcuate configuration and extends from the louver assembly housing 28, as illustrated. The second slider arm 66 includes a slot 68 within which pin 64 is also slidably engaged. Movement of the first slider arm 56 as a result of user rotation of the thumbwheel 52 causes rotation of the louver assembly as illustrated in FIGS. 6–8.

Figure 6:
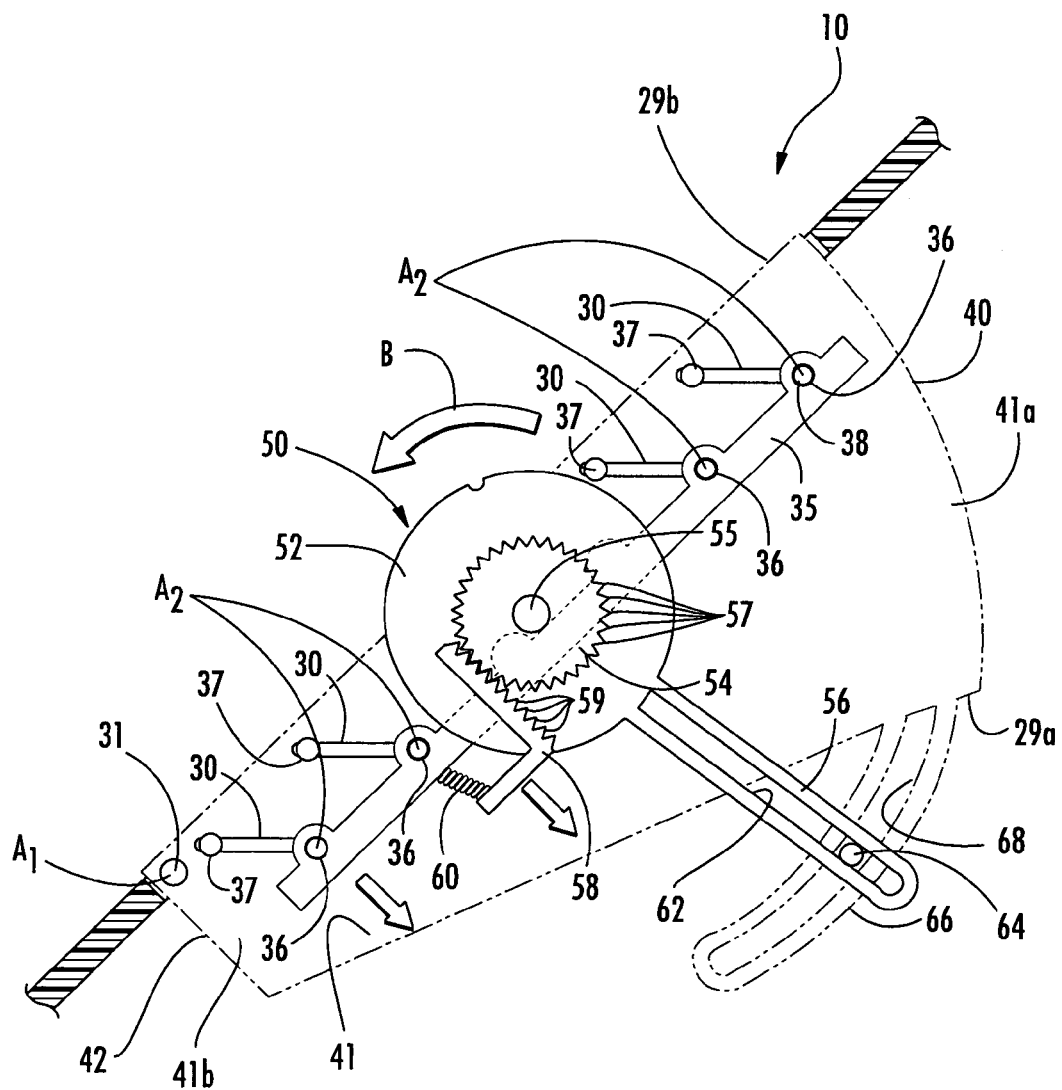
FIG. 6 is the same section view of the air duct outlet as FIG. 5 and that illustrates partial rotation of the actuator such that the horizontal louvers are partially open.

In FIG. 6, user rotation of the thumbwheel 52, indicated by arrow B, has caused the pinion gear 54 to rotate which has caused the rack 58 to move and partially pivot the louvers 30. The amount of user rotation of the thumbwheel 52 in FIG. 6 is not enough to cause movement of the louver assembly 26. However, in FIG. 7, user rotation of the thumb wheel 52, indicated by arrow C, has caused the first slider arm 56 and pin 64 to engage wall 41 of the louver assembly housing 28. Further rotation of the thumb wheel 52, as illustrated in FIG. 8 by arrow D, causes the first slider arm 56 and pin 64 to cause the louver assembly to pivot outwardly as indicated by arrow E.

As illustrated in FIGS. 5–8, movement of the actuator 50 within a first range causes pivotal movement of the louvers 30, and movement of the actuator 50 within a second range different from the first range causes pivotal movement of the louver assembly 26. In the illustrated embodiment, the thumb wheel 52 of the actuator 50 can be rotated about one hundred eighty degrees (180°). Rotation of the thumb wheel 52 between zero degrees and about ninety degrees (0°–90°) causes pivotal movement of the louvers 30. Rotation of the thumb wheel 52 between ninety degrees and about one hundred eighty degrees (90°–180°) causes pivotal movement of the louver assembly 26 between flush and non-flush positions.

In the illustrated embodiment, another actuator 70 extends from the fascia 22 adjacent the opening 24 and is operably connected with the second set of louvers 32. A user is able to adjust the position of louvers 32 via movement of the actuator 70, as would be understood by those skilled in the art.

Figure 10:
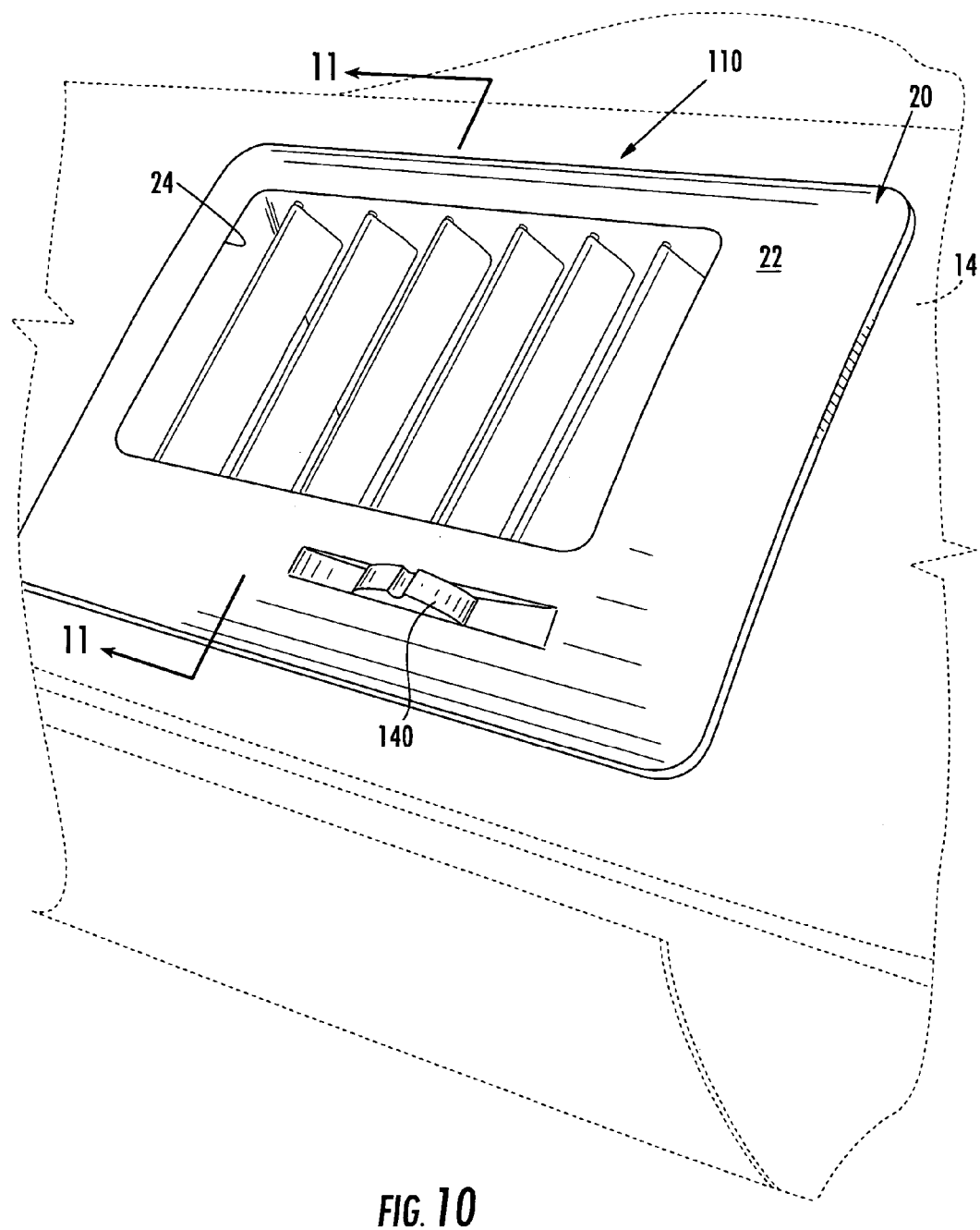
FIG. 10 is a front perspective view of an air duct outlet, according to embodiments of the present invention, wherein the air duct outlet is in a flush-mounted position relative to an inclined portion of a vehicle instrument panel.
Figure 11:
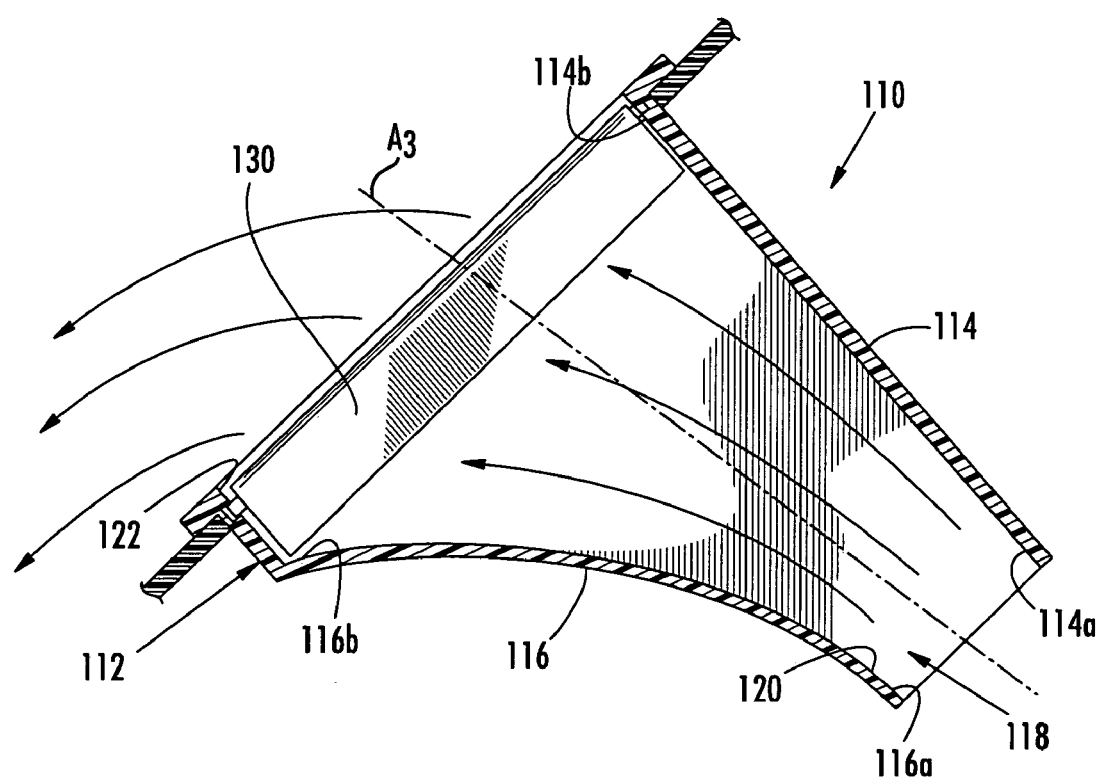
FIG. 11 is a section view of the air duct outlet of FIG. 10 taken along lines 11—11.

Referring to FIGS. 10–11, an air duct outlet 110, according to embodiments of the present invention, is illustrated. The illustrated air duct outlet 110 is disposed within an opening in the instrument panel 14 of a vehicle and includes a body 20 having a fascia 22 with an opening 24 formed therein. The portion of the instrument panel 14 in which the air duct outlet 110 is disposed has a slanted configuration. As illustrated in FIG. 11, the air duct outlet 110 includes a housing 112 having a generally planar first wall 114 and a convexly-curved second wall 116 that are in adjacent, spaced-apart relationship and that define an air passageway 118. The air passageway 118 has an inlet 120 and a flared outlet 122. An air stream flowing through the air passageway 118 adheres to the second wall 116 and exits from the outlet 122 in a direction that is substantially transverse to a direction $A_3$ that is normal to the outlet 122.

In the illustrated embodiment, respective end portions 114a, 116a of the first and second walls 114, 116 at the air passageway inlet 120 are substantially parallel. Respective end portions 114b, 116b of the first and second walls 114, 116 at the air passageway outlet 122 are substantially orthogonal.

The illustrated air duct outlet 110 also includes a set of louvers 130 pivotally secured within the housing 112 in spaced-apart adjacent relationship, and that are configured to adjust the direction of air flowing through the housing 112. An actuator 140 extends from the housing 112 and is operably connected with the louvers 130 and configured to cause pivotal movement thereof.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. An air duct outlet, comprising:
   a body comprising a fascia with an opening formed therein;
   a louver assembly disposed within the fascia opening and movable between a first position substantially flush with the fascia and a second position substantially nonflush with the fascia, wherein the louver assembly comprises:
      a housing comprising an inlet and an outlet; and
      a set of louvers secured within the housing in spaced-apart adjacent relationship, wherein the louvers are configured to adjust the direction of air flowing through the housing; and
   an actuator extending from the fascia adjacent the opening, wherein the actuator is operably connected with the louver assembly and configured to move the louver assembly between the first and second positions.

2. The air duct outlet of claim 1, wherein the set of louvers are pivotally secured within the housing, wherein each louver in the set is pivotally secured about one of a plurality of substantially parallel axes, wherein the set of louvers are operably connected together such that pivotal movement of any one of the louvers in the set causes pivotal movement of the remaining louvers in the set, and wherein the actuator is operably connected with a louver and configured to cause pivotal movement thereof.

3. The air duct outlet of claim 2, wherein movement of the actuator within a first range causes pivotal movement of the louvers, and wherein movement of the actuator within a second range different from the first range causes pivotal movement of the louver assembly between the first and second positions.

4. The air duct outlet of claim 2, wherein the actuator is configured to rotate about one hundred eighty degrees (180°) relative to an axis, wherein rotation of the actuator between zero degrees and about ninety degrees (0°–90°) causes pivotal movement of the louvers, and wherein rotation of the actuator between ninety degrees and about one hundred eighty degrees (90°–180°) causes pivotal movement of the louver assembly between the first and second positions.

5. The air duct outlet of claim 1, wherein a second set of louvers are pivotally secured within the housing, wherein each louver in the second set is pivotally secured about one of a second plurality of substantially parallel axes, wherein the second set of louvers are operably connected together such that pivotal movement of any one of the louvers in the second set causes pivotal movement of the remaining louvers in the second set, and further comprising a second actuator extending from the fascia adjacent the opening that is operably connected with a louver in the second set and configured to cause pivotal movement thereof.

6. The air duct outlet of claim 1, wherein the set of louvers are pivotally secured within the housing adjacent the housing outlet.

7. The air duct outlet of claim 4, wherein the second set of louvers are pivotally secured within the housing adjacent the housing inlet.

8. The air duct outlet of claim 1, wherein the housing comprises a convexly-curved wall, and wherein an air stream flowing through the housing adheres to the convexly-curved wall and exits from the housing outlet in a direction that is substantially transverse to a direction normal to the outlet.

9. An air duct outlet, comprising:
a body comprising a fascia with an opening formed therein;
a louver assembly disposed within the fascia opening and movable between a first position substantially flush with the fascia and a second position substantially nonflush with the fascia, wherein the louver assembly comprises:
  a housing comprising an inlet and an outlet; and
  a first set of louvers secured within the housing in spaced-apart adjacent relationship, wherein each louver in the first set is pivotally secured about one of a first plurality of substantially parallel axes, wherein the first set of louvers are operably connected together such that pivotal movement of any one of the louvers in the first set causes pivotal movement of the remaining louvers in the first set; and
  a second set of louvers secured within the housing in spaced-apart adjacent relationship, wherein each louver in the second set is pivotally secured about one of a second plurality of substantially parallel axes, wherein the second set of louvers are operably connected together such that pivotal movement of any one of the louvers in the second set causes pivotal movement of the remaining louvers in the second set;
  wherein the louvers in the first and second sets are configured to adjust the direction of air flowing through the housing;
a first actuator extending from the fascia adjacent the opening, wherein the first actuator is operably connected with a louver in the first set and with the louver assembly, wherein the first actuator is configured to move the louver assembly between the first and second positions and to cause pivotal movement of the first set of louvers; and
a second actuator extending from the fascia adjacent the opening, wherein the second actuator is operably connected with a louver in the second set and is configured to cause pivotal movement thereof.

10. The air duct outlet of claim 9, wherein movement of the first actuator within a first range causes pivotal movement of the first set of louvers, and wherein movement of the first actuator within a second range different from the first range causes pivotal movement of the louver assembly between the first and second positions.

11. The air duct outlet of claim 9, wherein the first actuator is configured to rotate about one hundred eighty degrees (180°) relative to an axis, wherein rotation of the first actuator between zero degrees and about ninety degrees (0°–90°) causes pivotal movement of the first set of louvers, and wherein rotation of the first actuator between ninety degrees and about one hundred eighty degrees (90°–180°) causes pivotal movement of the louver assembly between the first and second positions.

12. The air duct outlet of claim 9, wherein the first set of louvers are pivotally secured within the housing adjacent the housing outlet.

13. The air duct outlet of claim 9, wherein the second set of louvers are pivotally secured within the housing adjacent the housing inlet.

14. The air duct outlet of claim 9, wherein the first and second sets of axes lie within different respective planes.

15. The air duct outlet of claim 9, wherein the first and second sets of axes are transverse relative to each other.

16. The air duct outlet of claim 9, wherein the first and second sets of axes are orthogonal relative to each other.

17. The air duct outlet of claim 9, wherein each of the louvers in the first and second sets of louvers has a substantially rectangular configuration.

18. The air duct outlet of claim 9, wherein the housing comprises a convexly-curved wall, and wherein an air stream flowing through the housing adheres to the convexly-curved wall and exits from the housing outlet in a direction that is substantially transverse to a direction normal to the outlet.

19. A vehicle, comprising;
an instrument panel having an opening; and
an air duct outlet disposed within the instrument panel opening, comprising:
  a body comprising a fascia with an opening formed therein;
  a louver assembly disposed within the fascia opening and movable between a first position substantially flush with the fascia and a second position substantially nonflush with the fascia, wherein the louver assembly comprises:

a housing comprising an inlet and an outlet; and a set of louvers secured within the housing in spaced-apart adjacent relationship, wherein the louvers are configured to adjust the direction of air flowing through the housing; and an actuator extending from the fascia adjacent the opening, wherein the actuator is operably connected with the louver assembly and configured to move the louver assembly between the first and second positions.

20. The vehicle of claim 19, wherein the set of louvers are pivotally secured within the housing, wherein each louver in the set is pivotally secured about one of a plurality of substantially parallel axes, wherein the set of louvers are operably connected together such that pivotal movement of any one of the louvers in the set causes pivotal movement of the remaining louvers in the set, and wherein the actuator is operably connected with a louver and configured to cause pivotal movement thereof.

21. The vehicle of claim 20, wherein movement of the actuator within a first range causes pivotal movement of the louvers, and wherein movement of the actuator within a second range different from the first range causes pivotal movement of the louver assembly between the first and second positions.

22. The vehicle of claim 20, wherein the actuator is configured to rotate about one hundred eighty degrees (180°) relative to an axis, wherein rotation of the actuator between zero degrees and about ninety degrees (0°–90°) causes pivotal movement of the louvers, and wherein rotation of the actuator between ninety degrees and about one hundred eighty degrees (90°–180°) causes pivotal movement of the louver assembly between the first and second positions.

23. The vehicle of claim 19, wherein a second set of louvers are pivotally secured within the housing, wherein each louver in the second set is pivotally secured about one of a second plurality of substantially parallel axes, wherein the second set of louvers are operably connected together such that pivotal movement of any one of the louvers in the second set causes pivotal movement of the remaining louvers in the second set, and further comprising a second actuator extending from the fascia adjacent the opening that is operably connected with a louver in the second set and configured to cause pivotal movement thereof.

24. The vehicle of claim 19, wherein the set of louvers are pivotally secured within the housing adjacent the housing outlet.

25. The vehicle of claim 23, wherein the second set of louvers are pivotally secured within the housing adjacent the housing inlet.

26. The vehicle of claim 19, wherein the housing comprises a convexly-curved wall, and wherein an air steam flowing through the housing adheres to the convexly-curved wail and exits from the housing outlet in a direction that is substantially transverse to a direction normal to the outlet.

27. An air duct outlet, comprising a housing comprising a planar first wall and a convexly-curved second wall that are in adjacent, spaced-apart relationship and that define an air passageway having an inlet and a flared outlet, and wherein an air stream flowing through the air passageway adheres to the second wall and exits from the outlet in a direction that is substantially transverse to a direction normal to the outlet.

28. The air duct outlet of claim 27, wherein respective end portions of the first and second walls at the air passageway inlet are substantially parallel.

29. The air duct outlet of claim 27, wherein respective end portions of the first and second walls at the air passageway outlet are substantially orthogonal.

30. The air duct outlet of claim 27, further comprising a set of louvers pivotally secured within the housing in spaced-apart adjacent relationship, wherein the louvers are configured to adjust the direction of air flowing through the housing.

31. The air duct outlet of claim 30, further an actuator extending from the housing, wherein the actuator is operably connected with the louvers and configured to cause pivotal movement thereof.

* * * * *